(12) United States Patent
Thomsen

(10) Patent No.: US 9,821,988 B2
(45) Date of Patent: Nov. 21, 2017

(54) MOTORIZED SNOW VEHICLE LIFTING DEVICE

(71) Applicant: Ronald Tib Thomsen, Kalispell, MT (US)

(72) Inventor: Ronald Tib Thomsen, Kalispell, MT (US)

( * ) Notice: Subject to any disclaimer, the term of this patent is extended or adjusted under 35 U.S.C. 154(b) by 0 days.

(21) Appl. No.: 14/817,024

(22) Filed: Aug. 3, 2015

(65) Prior Publication Data

US 2016/0368746 A1    Dec. 22, 2016

Related U.S. Application Data

(60) Provisional application No. 62/183,174, filed on Jun. 22, 2015.

(51) Int. Cl.
| | |
|---|---|
| *B60P 3/00* | (2006.01) |
| *B62H 3/00* | (2006.01) |
| *B66F 5/02* | (2006.01) |
| *B62B 1/14* | (2006.01) |
| *B62B 1/26* | (2006.01) |

(52) U.S. Cl.
CPC ............. *B66F 5/02* (2013.01); *B62B 1/14* (2013.01); *B62B 1/26* (2013.01)

(58) Field of Classification Search
CPC ... B66F 3/005; B62B 2203/10; B62B 5/0089; B60P 3/00; B62H 3/00
See application file for complete search history.

(56) References Cited

U.S. PATENT DOCUMENTS

| | | | | |
|---|---|---|---|---|
| 3,700,212 | A | * | 10/1972 | Morgenberger ...... B62B 5/0083 254/131 |
| 3,860,078 | A | | 1/1975 | Stoick |
| 4,288,087 | A | | 9/1981 | Morrison |
| D310,904 | S | | 9/1990 | Dinges |
| 5,441,378 | A | | 8/1995 | Puls |
| 5,716,061 | A | | 2/1998 | Sloan |
| 6,015,254 | A | | 1/2000 | Keeler |
| 6,206,386 | B1 | | 3/2001 | Briggs |
| 6,869,087 | B2 | | 3/2005 | Veeser |
| 7,350,790 | B1 | * | 4/2008 | Wilson ..................... B60D 1/00 280/402 |

OTHER PUBLICATIONS

Explorer Ski Wheels—webpage advertisement: http://www.explorermoto.com/en/accessories.aspx.
Timbersled Snow Bike Dolly—website advertisement: http://www.timbersled.com/sbaccessories.htm.
D.O.C. Performance Snow Bike Dolly—website advertisement: http://www.docperformance.ca/aftermarket-products.
Motorcycle Superstore—Motorized Snow Vehicle Dollies—website advertisement:http://www.motorcycle-superstore.com/search/go?Ntt=SNOW%20DOLLY.

* cited by examiner

*Primary Examiner* — Bryan Evans
(74) *Attorney, Agent, or Firm* — Robin Kelson Consulting

(57) ABSTRACT

Devices and methods of use are provided for lifting and locking the rear drive track assembly and front ski assembly of a motorized snow vehicle into an elevated position off the ground. The devices comprise wheels for stably maneuvering the elevated snow vehicle over a dry surface.

24 Claims, 12 Drawing Sheets

MOTORIZED SNOW VEHICLE LIFTING DEVICE

CROSS REFERENCE TO RELATED APPLICATIONS

This application claims the benefit of Provisional Application No. 62/183,174, filed Jun. 22, 2015, the disclosure of which is hereby expressly incorporated in its entirety by reference herein.

FIELD OF USE

Embodiments of the present disclosure find applicability in the field of snow vehicles for personal use. One useful field includes the field of snow vehicle lifting devices for locking and/or maneuvering snow vehicles, particularly motorized snow vehicles, in an elevated position on dry ground.

BACKGROUND

Snowmobiles, also known as snow sleds or sleds, snow bikes and other snow vehicles, particularly motorized personal snow vehicles for traveling across packed and unpacked snow, are well-known and well-characterized in the art. These vehicles are characterized by having one or more front skis and rear, endless, ground-engageable flexible drive tracks that support movement across snow-covered terrain. Unfortunately, the skis and drive track make it difficult to maneuver these snow vehicles on dry ground. This lack of ease of maneuverability makes moving, storing, and working on these vehicles cumbersome and even difficult. Particular issues include managing the weight and size of the vehicle and avoiding damaging a floor surface by contact with a vehicle's carbide skis. When mechanical repairs or maintenance is required, the vehicle needs to be elevated sufficiently and securely to allow stable and safe access to all parts of the vehicle.

A number of dollies, carts or lifting mechanisms are described in the art for lifting and transporting snow vehicles, particularly snowmobiles. Typically, the devices comprise wheels and some kind of pivoting or levering mechanism, often under the vehicle's center of gravity. Some devices require the snowmobile to be driven onto the dolly, others position the dolly under the vehicle and then lever the dolly to hoist the vehicle. The following patents are representative of the art:

U.S. Pat. No. 6,015,254 describes a centrally positioned levering device for lifting a snowmobile and balancing it in an elevated position as it is maneuvered about a surface. U.S. Pat. No. 6,869,087 describes a self-loading dolly onto which a snowmobile is driven. U.S. Pat. No. 5,716,061 describes a dolly positioned under the front portion of a snowmobile and comprising a jack for lifting the rear track portion off the ground. U.S. Pat. No. 5,441,378 describes a front positioning dolly rollably supported by casters and comprising a pivotable lifting lever. U.S. Pat. No. 3,860,078 and U.S. Pat. No. 4,288,087 each describe a front pair of ski supporting dollies and a rear supporting dolly or carriage.

None of the dollies or lifting devices described above are particularly adapted for secure, stationary, elevated access to a motorized snow vehicle, including a snowmobile, particularly for maintenance or repair applications to the rear drive track assembly. In addition, the lifting devices in the art that are adapted for snowmobiles are not readily adaptable or useful for lifting other motorized snow vehicles, such as motorized snow bikes. The state of the art for moving snow bikes across a dry surface is represented by Timbersled Products Inc.'s "All/Terrain Wheel Kit", which comprises two laterally spaced wheel sets, one positioned under the front ski and secured by means of a rachet strap; the other positioned under the rear endless drive track. The kit is not designed to lift the rear assembly sufficiently or securely for maintenance applications. Moreover, the device is not adapted to keep its wheels from lifting off the ground when the vehicle is being moved or turned on a hard, dry surface, which can put the attached snow bike at risk of tipping over, especially while turning the bike or when moving the bike over unlevel surfaces. See, for example, http://www.timbersled.com/sbaccessories.htm.

There remains a need for simple, easy-to-use devices suitable for lifting and/or moving motorized snow vehicles that also provide stable and secure access to the vehicle for maintenance and repairs, and which also are adaptable and have utility for a range of snow vehicles, including snowmobiles and motorized snow bikes.

SUMMARY

This summary is provided to introduce a selection of concepts in a simplified form that are further described below in the Detailed Description. This summary is not intended to identify key features of the claimed subject matter on its own, nor is it intended to be used on its own as an aid in determining the scope of the claimed subject matter.

In accordance with one embodiment of the disclosure provided herein are devices and methods for independently lifting and locking the rear drive track assembly and front ski assembly of a motorized snow vehicle into an elevated position off the ground. In accordance with another embodiment the devices comprises wheels for stably moving and turning the elevated snow vehicles over dry ground.

In accordance with one embodiment, the device for lifting and locking a rear drive track assembly into an elevated position off the ground comprises a fulcrumming means. In another embodiment the fulcrumming means comprises a C-shaped pivoting member having an elongated center section dimensioned to span a drive track and opposing legs with free terminal ends, the legs dimensioned to contact the ground exterior to the drive track when the pivoting member is passed through the opening defined by a drive track such that the center section spans the track. In one preferred embodiment, the fulcrumming means comprises a camming surface that extends substantially perpendicularly from the axial length of the pivoting member center section and is dimensioned to contact the drive track rail floor. In another preferred embodiment, the camming surface is provided by a pair of brackets whose terminal free end provides the camming surface, and the brackets are positioned on the center section such that the bracket sides abut or lie substantially flush with the drive track suspension rail sides.

In another embodiment, the fulcrumming brackets also comprise openings or apertures for receiving a rod dimensioned to pass through parallel opposing openings in the drive track assembly's parallel suspension rails. When the rod is engaged with the rails and the brackets through the openings, the drive track assembly is attached to the pivoting device and moves with it as the device is lifted over the bracket fulcrum camming surface and placed on the suspension rail top surface. In another embodiment, the device includes a detachable levering means for facilitating lifting the device over its fulcrum point and onto the rails. In another preferred embodiment, free terminal ends of the pivoting member legs comprise wheels having contact with the ground and facilitate levering the pivot member over its fulcrum point and into position on the rails. Once the device is on the rails the lifted rear assembly is effectively locked in its elevated position and is available for repairs. When the front assembly also is lifted, the vehicle can be stably maneuvered and turned on dry ground.

In another embodiment, the disclosure herein provides devices for stably lifting and locking a motorized front ski assembly into an elevated position off the ground. In one embodiment the front ski assembly lifting device comprises fulcrumming means. In another embodiment the fulcrumming means comprises a C-shaped pivoting member having a center section dimensioned to span a front ski and opposing legs with free terminal ends, the legs dimensioned to contact the ground exterior to the ski when the pivoting member spans the front ski. In one preferred embodiment, the fulcrumming means comprises bracket that extends substantially perpendicularly from the axial length of the pivoting member center section and is dimensioned to contact the juncture between the ski spindle and the ski top surface. In another embodiment, the device comprises front ski engagement means, the means comprising members extending inward from the device legs and dimensioned to lift and support the rear of the ski in an elevated position as the pivoting member is rotated about its fulcrum point. In still another embodiment, the device comprises a lever for facilitating movement of the device about its fulcrum point. In still another embodiment, the terminal free ends of the device legs also include wheels that contact the ground and can facilitate movement of the device about its fulcrum point and provide means for moving the vehicle over a dry surface. In one preferred embodiment, the fulcrum bracket free end engages the spindle juncture and the device is pulled forward and over the fulcrum point until it rests on the ski surface, which action lifts the device legs rearward and up, lifting and holding the rear of the ski in an elevated position. In still another embodiment, the device wheel assemblies include rotating tabs that facilitate keeping the device legs in the elevated and locked position.

In still another embodiment, the front ski lifting device comprises a cradle dimensioned to receive and support a front ski in a lifted position, and dimensioned to accommodate a range of ski widths, keels and skags. In another embodiment the cradle comprises means for engaging or securing the ski to the cradle. In still another embodiment, the securing means can be removable. In still another embodiment, the securing means can include a flexible strap. In another embodiment, the cradle comprises a plurality of wheels attached to the cradle at an angle with stabilizing axle assemblies such as trucks that provide pivoting action when the attached ski assembly is moving and turning on dry ground, allowing the cradle and the attached front ski assembly, to remain in contact with the ground during movement. In a preferred embodiment, the cradle comprises a front and rear wheel pair, each attached to the cradle with a truck axle assembly.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Embodiments of the present disclosure provide devices, components, mechanisms and methods of use directed to means for performing work on and maneuvering personal motorized snow vehicles across dry ground, including interior garage floors, without causing damage to the vehicle or the floor. In preferred embodiments of the disclosure the snow vehicles comprise at least one front ski assembly and a rear drive track assembly comprising a parallel suspension rail system and an endless drive track, such as are found on snowmobiles (also referred to in the art and herein as "snow sleds" or "sleds") and motorized snow bikes.

Figure 1:
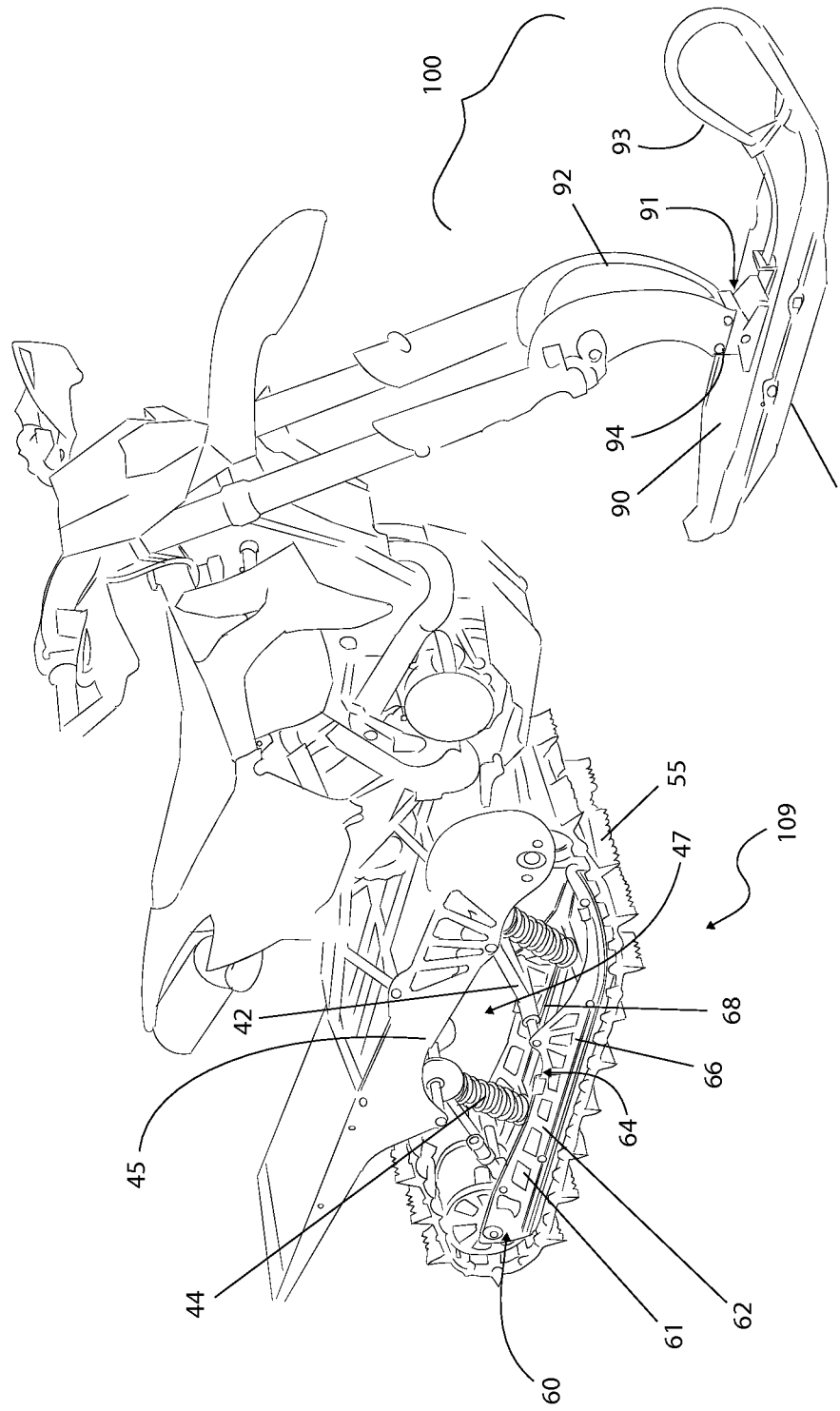
FIG. 1 is an illustration of the front ski and rear track assembly of a motorized snow vehicle.

An exemplary motorized snow vehicle is illustrated in FIG. 1. In the figure, the front ski assembly 100 typically comprises a front ski 90 with a handle 93, a ski spindle 92 connecting ski 90 to the vehicle and attached to the top surface of ski 90, creating a front juncture edge 91 and a rear juncture edge 94. Useful ski spindles in the art can take on a variety of shapes and be made of a range of materials, including plastics and metals, particularly lightweight metals such as extruded aluminum. Front ski 90 also comes in a range of widths, lengths and keel numbers and keel depths, depending on the user's choice of activity and terrain (racing, mountain or trails) and choice of vehicle, sled or bike, for example. In addition, front ski assemblies also generally include one or more ski steering rod or skags 96 attached to the bottom of ski 90. Typically, these skags are made of metal, often carbide steel.

The rear drive track assembly 110 of a motorized snow sled or bike typically comprises an endless, flexible, ground-engageable drive track 55 covering a pair of parallel slide or suspension rails 60. The spanning distance between the rails is typically equal to or less than the width of track 55. The longitudinally extending parallel rails 60 each typically have longitudinally spaced slots or openings 61 that are aligned with the slots on the opposing rail. Rails 60 further comprise a top edge or bar 64, a bottom edge or bar 66, and vertical braces or bars 62 separating slots 61. In addition, rails 60 further include a bottom lip or edge or floor surface 68 extending perpendicularly from the bottom of rail wall 60. Typically floor edge 68 extends inward toward the center of the snow vehicle and the opposing rail, and it could extend outward. Useful drive tracks can be made of any suitably flexible and durable material. Early drive tracks were often made of rubber and modern tracks typically are made of Kevlar today. Suspension rails typically comprise a metal composition that maximizes strength and lightness. Drive track widths and lengths can vary, based on the vehicle and its use, and therefore so can the lengths and heights of the suspension rails, as well as the interior spanning distance between them.

Rear drive track assembly 110 also includes an interior open space 47 defined by the top bar 64 of suspension rails 60, the bottom of the vehicle subframe 45, forward track struts 43, and aft adjustable shock 42. The dimensions of interior open space 47 vary by vehicle, and can range anywhere from about 6-24 inches in height and/or length.

Rear Track Assembly Lifting Component

Overview

Referring now to FIGS. 2-7, embodiments of a personal snow vehicle rear drive track assembly lifting device 10 in accordance with the present disclosure are illustrated. The rear drive track assembly lifting device 10 comprises a fulcrumming means 12, a drive track engagement means 22, and a lever 34 that assemble to lift the fulcrumming means over its center of gravity into an over-center, self-locking position when it is engaged with the rear track assembly, thereby elevating the vehicle's rear assembly securely into a stationary position for maintenance and repairs. Preferably, lever 34 removably attaches to fulcrumming means 12. In addition, engaging means 22 described in more detail below, preferably engages with or otherwise removably attaches fulcrumming means 12 to the snow vehicle. Preferably the engagement means 22 attaches fulcrumming means 12 to the snow vehicle by engaging with the vehicle's suspension rails.

Fulcrumming Means

Figure 2:
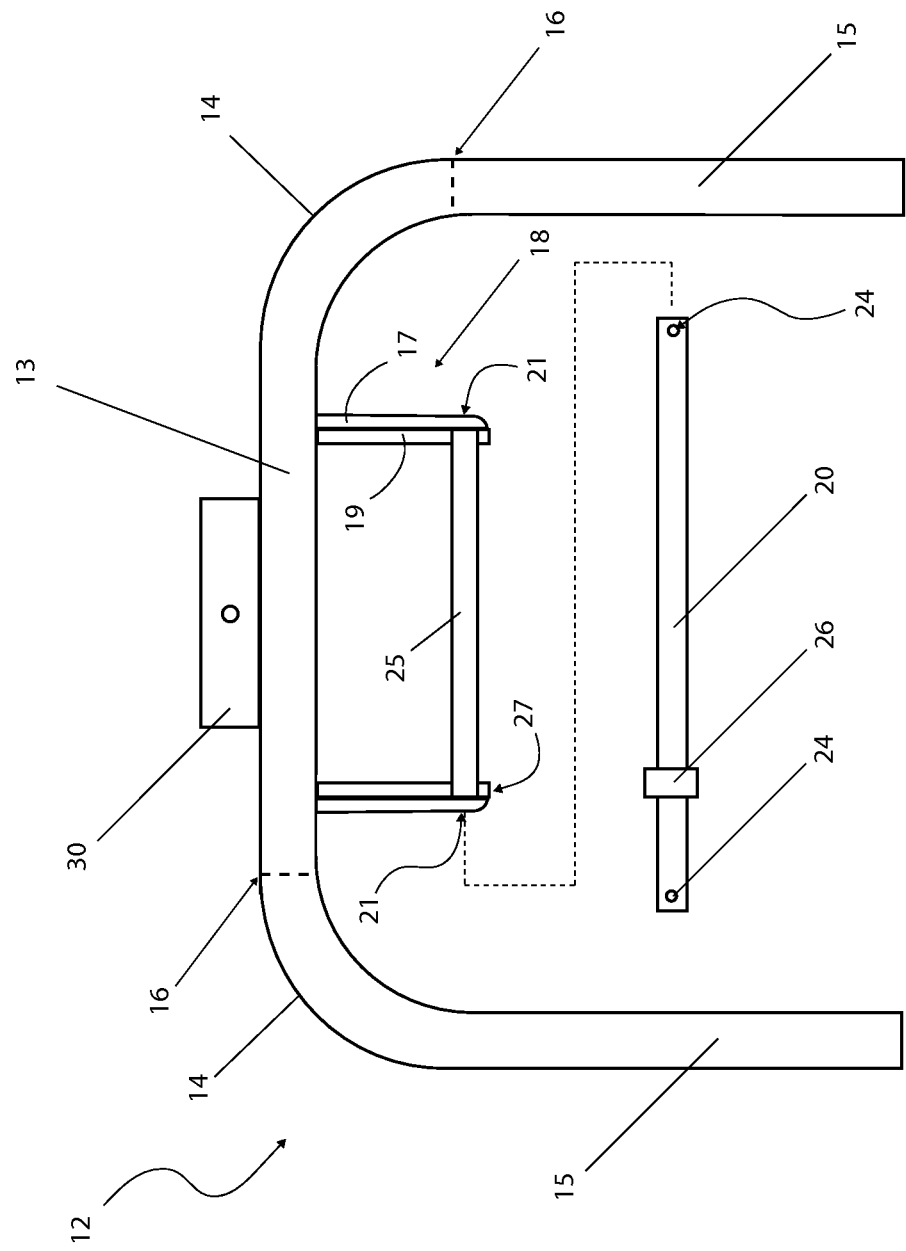
FIG. 2 is an illustration of a snow vehicle rear drive track assembly over-center self-locking lifting device of the present disclosure, comprising a static fulcrumming mechanism.

Turning now to FIG. 2 in particular, fulcrumming means 12 comprises an elongated center member 13 dimensioned to pass through central opening space 47 of a rear track assembly 110 and extend beyond the width of track 55. As will be appreciated by those having ordinary skill in the art, the preferred length of elongated member 13 can vary depending on the width of drive track 55. In one embodiment, elongated member 13 can have an overall length in the range of at least about 24 inches, and other lengths, both longer and shorter are envisioned; the primary consideration being that the length of elongated member 13 chosen allows for reasonable functioning of the self-locking fulcrumming mechanism described herein. In one preferred embodiment, member 13 is dimensioned to substantially span the width of drive track 55. As will be appreciated by those having ordinary skill in the art, elongated center section member 13 can have a specific, defined length, or it can have a modu-latable length that can be made longer or shorter as by a telescoping mechanism, for example.

Preferably, fulcrumming means 12 further comprises legs 15 that extend substantially perpendicularly from the opposing ends of elongated member 13, the legs and elongated member together describing an elongated, substantially C-shaped assembly (and referred to herein as a "pivot bar"). Legs 15 define the overall height of the C-shaped assembly or pivot bar, and their length preferably is dimensioned such that when the C-shaped assembly is placed through interior space 47 and the assembly is lifted such that the legs are substantially perpendicular to the ground surface and the assembly is substantially vertical in interior space 47, the overall height of the pivot bar is less than the upper boundary of interior space 47 defined by the bottom edge of subframe 45, and the assembly can move freely within space 47. As will be appreciated by those having ordinary skill in the art, preferred leg lengths and overall pivot bar heights can depend on the choice of vehicle and the dimensions of the vehicle's interior space 47. In one embodiment, the pivot bar can have a vertical height of at least about 4 inches, in another embodiment, it can have a vertical height in the range of about 6-20 inches. In still another embodiment, it can have a vertical height of less than about 36 inches. In another embodiment, pivot bar legs 15 can have a length in the range of about 8-15 inches.

As will be appreciated by those having ordinary skill in the art, the angles 14 at the junctures of legs 15 and elongated member 13 can be curved as illustrated in FIG. 2 or comprise a true, sharp-angled 90° angle. Useful angle ranges in the range of about 30°-150° are contemplated, including in the range of about 45°-120°, or even in the range of about 60°-110°. Those having ordinary skill in the art will understand that primary considerations of the angles chosen include ease of maneuverability of the fulcrumming means 12 through the interior opening 47, and stable connections of leg 15 terminal free ends or their attached wheels 50 to the ground surface during the levering process.

Fulcrumming means 12 further comprises a pair of brackets 18 that provide the fulcrum pivoting points of the C-shaped assembly or pivot bar 12. Brackets 18 can extend substantially perpendicularly from the axial length of elongated center member 13 and be positioned on member 13 such that the spanning distance between brackets 18 substantially matches the spanning distance of the vehicle's suspension rails 60. In one preferred embodiment, the brackets are spaced at a distance from one another such that one face of the bracket lies flush with a vertical edge of a suspension rail. In another preferred embodiment, the terminal free end 27 of each bracket is dimensioned to contact suspension rail floor surface 68. In one embodiment, illustrated in FIGS. 2-4, the bracket positioning on member 13 can be static and accommodates a particular rail spanning distance. In another embodiment, described in more detail below, bracket positioning is modulatable, and accommodates variable rail spanning distances. As will be appreciated by those having ordinary skill in the art, the brackets can be positioned such that the span between the brackets is less than the span of the parallel suspension rails so that each bracket outer edge 17 fits substantially against the inner surface of a suspension rail and free bracket end 27 contacts the inside rail floor surface 68. In another embodiment the bracket span is greater than the span of the parallel rails and free bracket end 27 contacts an outside rail floor surface and each bracket inner edge 19 fits substantially against the outer surface of a suspension rail.

As will be appreciated by those having ordinary skill in the art, preferred bracket 18 dimensions can vary depending on the chosen height of fulcrumming means 12, the primary consideration being that bracket free end 27 remains in contact with rail floor surface 68 as fulcrumming means 12, the pivot bar, is levered into its over-center, locked position. In the embodiment where the pivot bar height is in the range of about 10-24 inches, a useful bracket 18 length is in the range of about 2.5-5 inches. In one embodiment, a useful bracket length can be in the range of about 3-4 inches.

As will be appreciated by those skilled in the art, terminal free bracket end 27 provides a pivoting or fulcrumming surface when it is in contact with rail floor surface 68, about which fulcrumming means 12 pivots as it is levered from its resting position up and over into its over-center, locked position. Accordingly, while the surface of terminal free end 27 can have any shape, including a shape with rectilinear edges or an angled point, it will be appreciated that a shape which effectively provides a camming surface can support the pivoting or fulcrumming step. In one embodiment, illustrated in FIG. 2, free bracket end 27 is chamfered, the chamfered edges effectively providing a camming surface. In the figure, the chamfer edges are angular, and they can also be smoother or more rounded in shape. Preferred number of chamfers, and lengths and angles of the chamfers, if utilized, can vary depending, for example, on rail height, and preferred pivot bar height, and are within the skill of the art to determine. Useful angles can range between about 10°-50°, and useful chamfer lengths can vary anywhere from about 0.1 inch to 3 inches.

It will be appreciated by those skilled in the art that bracket 18 lengths, angles and terminal free ends 27 also can be fabricated to provide a free end 27 camming surface having a chamfer edge that lies flat on rail floor surface 68 when fulcrumming means or pivot bar 12 is in its over-center position, and that has an edge length dimensioned such that it is sufficient to hold device 10 in a locked, over-center position when the chamfer edge is in contact with rail floor surface 68.

In another embodiment, bracket component 18 extends out and down from the plane of fulcrumming means 12 at an angle 42 less than 90° such that bracket free terminal end 27 contacts rail floor surface 68 easily. In one embodiment, the angle is within the range of between about 20° and 90°. In another embodiment, the angle is within the range of between about 30° and 60°. Useful angles are within the skill in the art to determine when provided with this disclosure.

Useful materials for the bracket components 18 include any materials having desired tensile strength and resistance to fatigue. In one preferred embodiment, the bracket can be a composite, comprising a metal portion for strength, including a steel portion, and a rail-contacting surface that allows the bracket to slide readily when in contact with a suspension rail. One useful material for this sliding portion of bracket 18 is a hard, resistant plastic, such as a nylon material. Other useful materials are well-known and well-characterized in the art. In the embodiment illustrated in FIGS. 6 and 7, the bracket members span a distance less than the distance between the parallel rails, and the outer surface of each said bracket member comprises a nylon material, while the inner surface comprises a steel member. Composite bracket member portions may be anchored together to form a single structure using any standard means known in the art. In the embodiment illustrated in FIG. 2 member portions are anchored using at least one screw 23, which may be countersunk. Other means are contemplated, including bolts, braces and the like.

Figure 3:
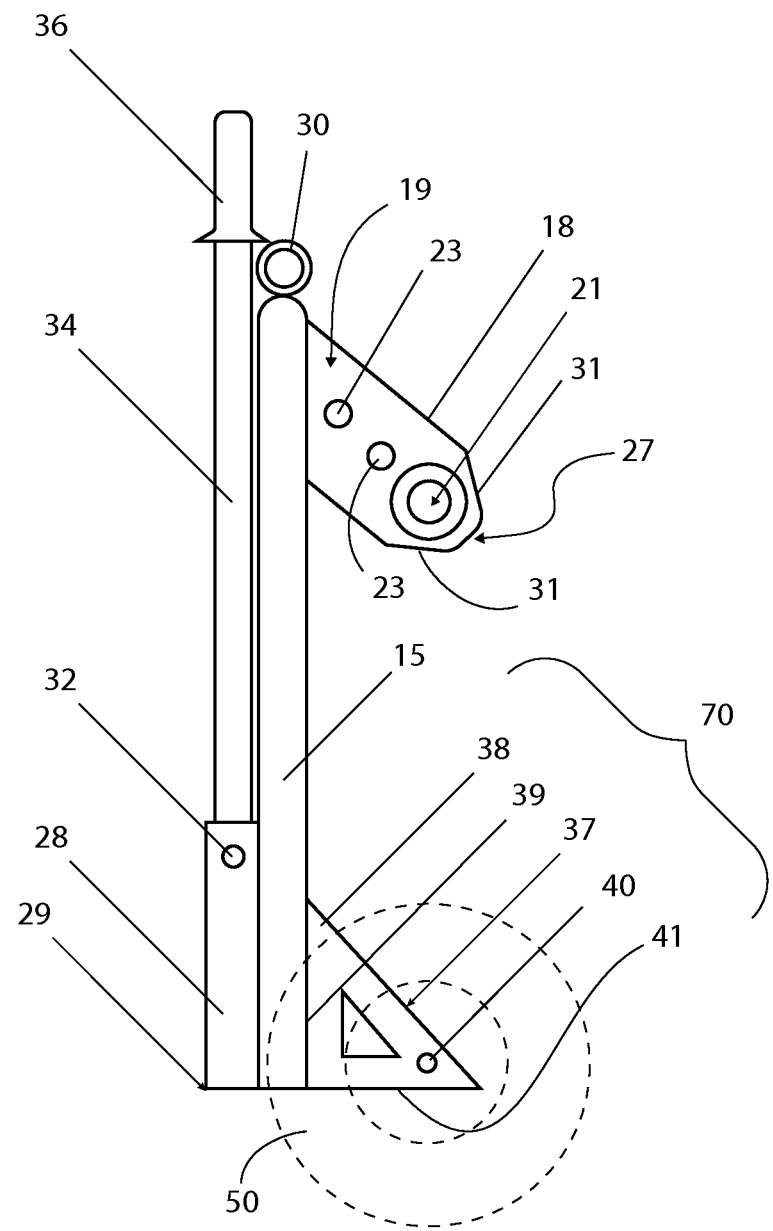
FIG. 3 is a side view of the over-center self-locking lifting device illustrated in FIG. 1.

In one preferred embodiment, illustrated in FIG. 3, leg sections 15 of pivot bar 12 further can include a wheel assembly 70 extending from the terminal free ends of each leg section in a plane perpendicular to the horizontal plane of pivot bar 12 and having a point of contact with the ground. In one preferred embodiment each wheel assembly 70 is integrally attached to pivot bar 12. In one embodiment, wheel assembly 70 can comprise a tab 38 and wheel member 50. In another embodiment, wheel assembly 70 can consist essentially of tab 38. In an embodiment where tab 38 provides the point of contact 43 with the ground, tab 38 can be shaped to facilitate levering pivot bar 12 into an over-centered, locked position as described above. In preferred embodiments that allow maneuvering of a lifted snow vehicle across a dry surface, wheel assembly 70 further can comprise a wheel member 50 removably attached to tab 38, and wheel member 50 can provide the point of contact with the ground. Wheel member 50 can be attached to tab 38 for example by means of an axle bolt assembly 40, such that the axis of rotation of wheel member 50 is substantially parallel to the floor. In another preferred embodiment comprising wheel member 50, wheel assembly 70 can maintain the rotational axis of wheel member 50 in a fixed position relative to pivot bar 12. Useful wheel members 50 can include any wheels dimensioned to support the weight of the snow vehicle to be maneuvered. Useful wheels can be pneumatic wheels and their equivalents having diameters in the range of about 4 inches to 12 inches, more preferably in the range of about 6 inches to 10 inches.

In one example, tab 38 can define a right triangle with tab legs 39 and 41 and a hypotenuse 37. In the example illustrated in FIG. 3, tab leg 39, referred to herein as "attached" tab leg 39 can be integrally attached to leg 15 in a substantially parallel relationship to leg 15 such that tab 38's right angle faces leg 15's terminal free end and "free" tab leg 4 extends substantially perpendicularly from the axial length of attached leg 15. When pivot bar 12 is positioned such that the pivot bar plane is in a raised position, more perpendicular to the ground than parallel to it, free tab leg 41 then can be substantially parallel to the ground; when the pivot bar plane is in a lowered position, more parallel to the ground than perpendicular to it, free tab leg 41 can be substantially perpendicular to the ground. As described herein below, in its resting position, the plane of rear drive track assembly pivot bar 12 is in a raised position, more perpendicular to the ground than parallel to it, and free leg 41 then can lie substantially more parallel to the ground. In its engaged, over center position, the plane of front ski pivot bar is in a lowered position more parallel with the ground, and free leg 41 is in a more perpendicular position relative to the ground. As will be appreciated by those having ordinary skill in the art, tab 38 can be configured as a solid component, or it can comprise a frame defining an opening, as illustrated in FIG. 3. Those skilled in the art will appreciate that useful tabs can have modified shapes from the right angled triangle disclosed here. For example, a right angle tab 38 also can be provided having an L-shape.

In the embodiment where only tab 38 is provided, point 43 of tab 38 can provide the point of contact with the ground when pivot bar 12 is in its engaged position, and tab leg 41 can provide the point of contact with the ground when pivot bar 12 is in its resting position.

As will be appreciated by those having ordinary skill in the art, snow vehicle rear drive track assembly lifting device 10 preferably is constructed of high strength, rigid materials being substantially resistant to fatigue. In one preferred embodiment fulcrumming means 12 can be composed of metal or metal alloys. In another preferred embodiment, fulcrumming means 12 can be composed of a chrome alloy steel. In the embodiments illustrated in FIGS. 2-4, fulcrumming means 12 is an elongated C-shaped tubular assembly, bent at angles 14 and having a substantially circular cross-section. In one embodiment, the tubular assembly has a diameter in the range of about 0.5-2.5 inches. As will appreciated by those having ordinary skill in the art, fulcrumming member 12 could have a square or rectangular cross-section, and a larger or smaller cross-section or diameter. In addition, fulcrumming means 12 could comprise a plurality of separable sections or components, if desired. For example, fabricating fulcrumming means 12 to comprise two or more pieces may be desired for ease of maneuvering the rear self-locking over-centering device through particular rear drive track openings. Illustrative positions for one or more such piece connections are illustrated as positions 16 on bar 12. As will be understood by those having ordinary skill in the art, other useful locations for piece connections are contemplated. Any useful means for connecting these section pieces together are contemplated, including, for example, by means of threads, pins, collars or the like.

Engaging Means

The over-center, self-locking rear drive track assembly lifting device 10 of the present disclosure also comprises means for engaging the lifting device with the snow vehicle's drive track assembly. In a preferred embodiment, the engaging means 22 is integral to fulcrumming means 12 and comprises means for attaching fulcrumming means 12 to suspension rails 60.

In one embodiment, illustrated in FIGS. 2, 4, 6 and 7, the drive track engaging means 22 comprises a rod 20 that passes through paired opposing rail openings 61 and through a component of fulcrumming means 12. In another embodiment, rod 20 passes through paired opposing apertures 21 in brackets 18. In still another embodiment, apertures 21 are positioned on brackets 18 such that they can be aligned with a rail opening 61. In one preferred embodiment, aperture 21 can be aligned with a rail opening 61 when fulcrumming means 12 is in the resting position and a bracket terminal free end surface 27 is contacting a rail floor surface 68.

Figure 6A:
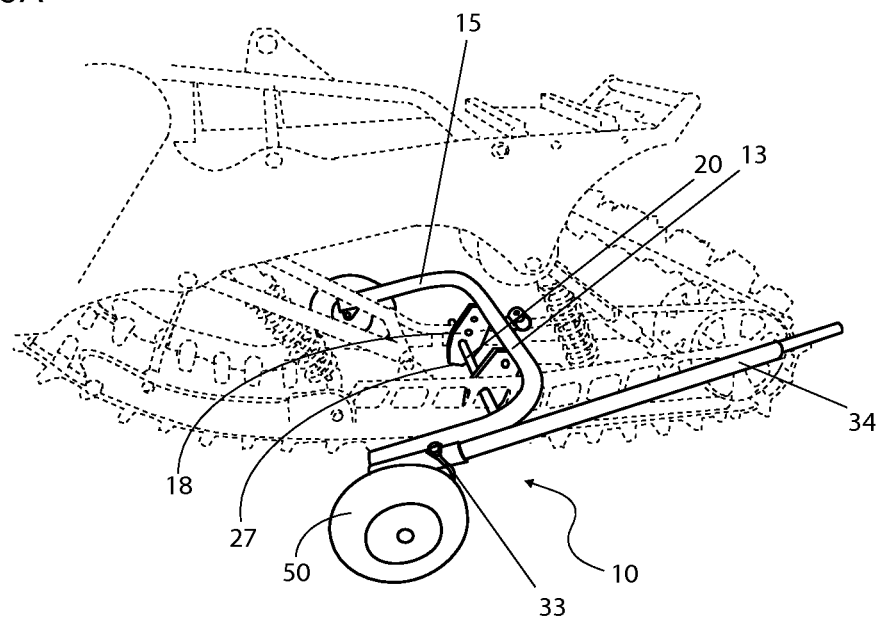
FIGS. 6A and 6B illustrate an embodiment of a snow vehicle rear drive track assembly lifting device of the present disclosure in the resting position (6A) and the engaged, locked and elevated position (6B) on a drive track.
Figure 6B:
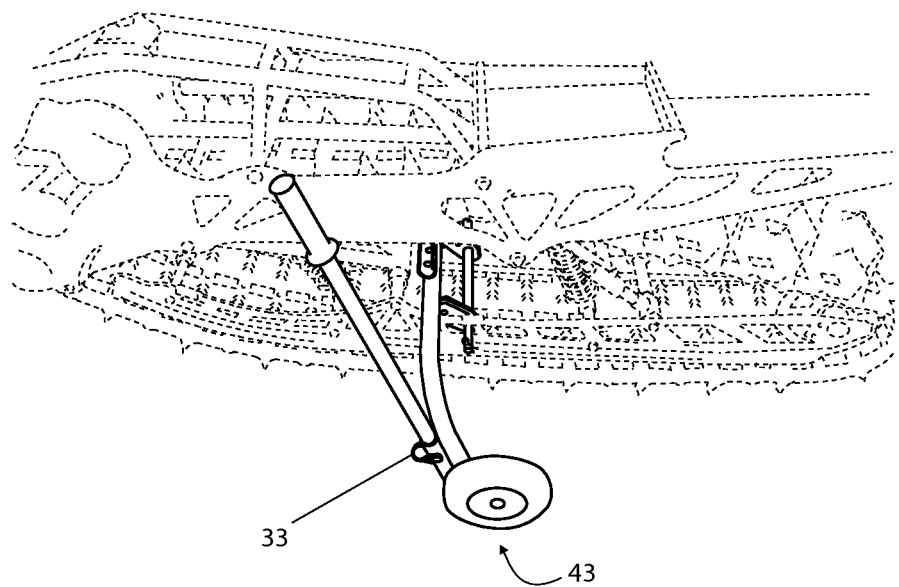
Figure 7A:
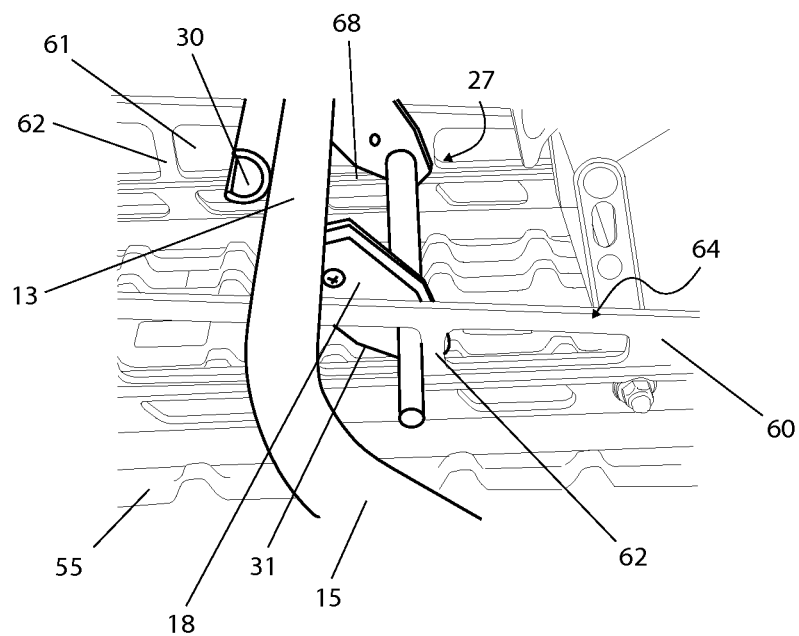
FIGS. 7A and 7B illustrate one embodiment of a fulcrumming mechanism of the present disclosure in the resting position (7A) and the engaged, locked and elevated position (7B) on a drive track.
Figure 7B:
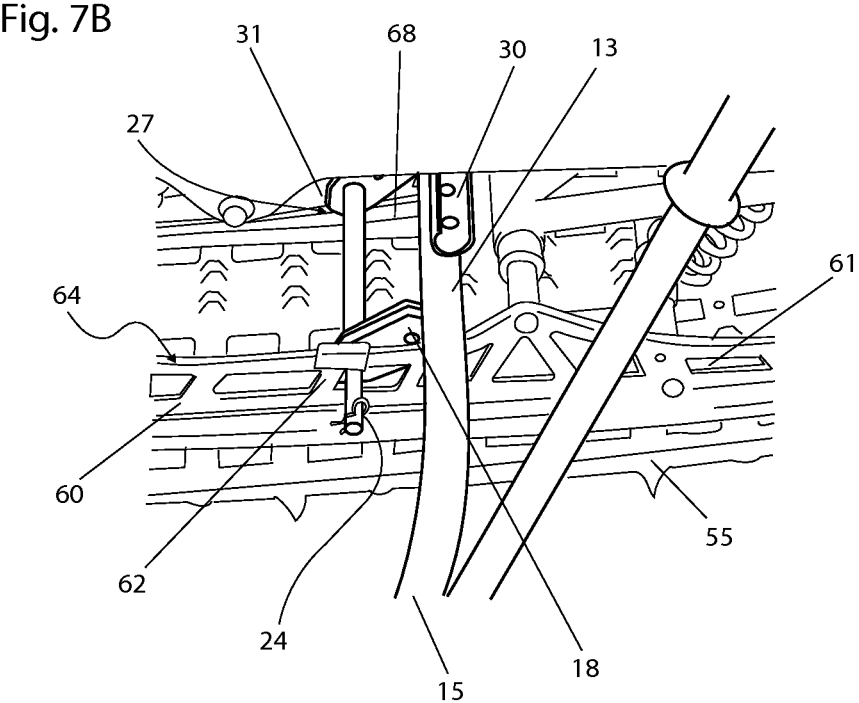
Figure 8A:
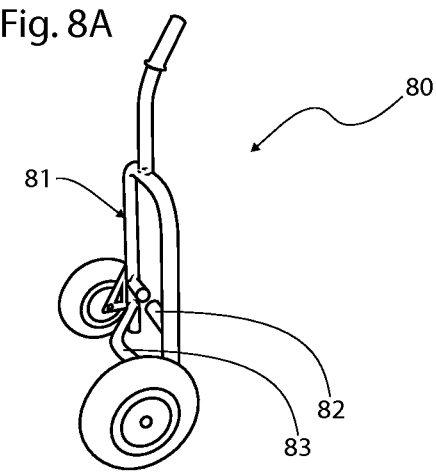
FIG. 8 illustrates one embodiment of a snow vehicle front ski assembly lifting device of the present disclosure.
Figure 8B:
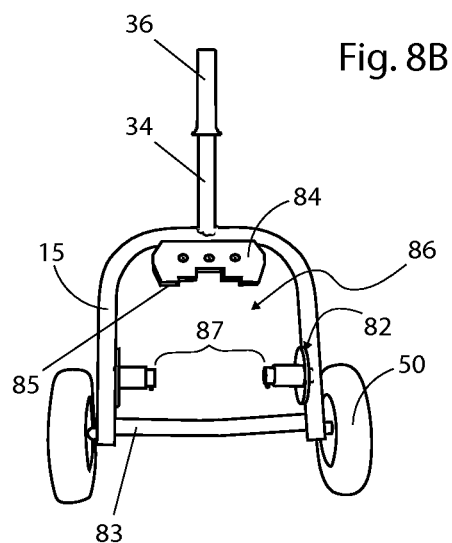
Figure 8C:
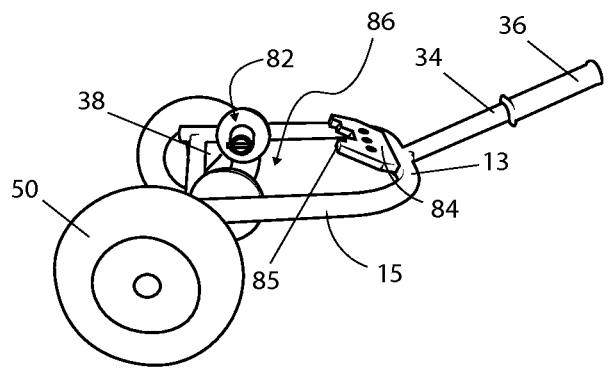

In the embodiment illustrated in FIGS. 4, 6 and 7, fulcrumming means 12 is a pivot bar, passed through drive track opening 47 so that legs 15 span drive track 55 and rest on the ground outside drive track 55. Similarly, bracket 18 outer edges 17 are substantially aligned with suspension side rail walls 60 and a bracket terminal free end 27 contacts rail floor edge 68 on each bracket. Rod 20 then can be passed through a first rail opening 61, through a first bracket aperture 21, and then through the second, paired bracket aperture 21 and second, paired rail opening 61. In the embodiment illustrated in the figures, rod 20 can include a stop 26 near one terminus of rod 20. Stop 26 can be dimensioned to prevent further passage of rod 20 through an aperture 21 and preclude the rod passing all the way through both bracket openings. In the figure, stop 26 comprises a collar having a dimension larger than aperture 21. As will be appreciated by those skilled in the art, the collar or stop can be made integral to rod 20, or it can be removably attached with, for example, a bolt or screw. Other means for limiting passage of rod 20 through both bracket apertures 21 are contemplated including, for example, by means of a clip, ring or pin, such as a dowel or cotter pin, that fits through an opening 24 on rod 20. Such rings, clips and pins, or a removable stop 26 also can be used for storing rod 20 in place when not in use.

As will be appreciated by those having ordinary skill in the art, useful apertures for engagement means 22 of the present disclosure include, without limitation, simple openings or holes in bracket member 18, and substantially hollow sleeves 25, including a contiguous sleeve 25 spanning the distance between the bracket members and having an inner diameter dimensioned to receive a rod; and a partial sleeve 25 extending from a bracket member and dimensioned to allow a rod to pass through. FIGS. 4A-4D illustrates an embodiment comprising a contiguous sleeve; FIG. 5 illustrates embodiments comprising partial sleeves. Hollow sleeves 25 can extend out from the outer surface 17 of a bracket member or they can extend inward from the inner surface 19 of a bracket member. It will appreciated by those having ordinary skill in the art that use of sleeves may provide additional desired rigidity and strength to engagement means 22.

When pivot bar 12 is attached to rear track assembly 110 via engagement means 22 disclosed herein, lifting pivot bar 12 on its fulcrum point also lifts the attached rear assembly. When the pivot bar is lifted over its center of gravity, the weight of the attached rear assembly tends to pull the bar over its center of gravity until the pivot bar itself or a component thereof comes to rest on rail top surface 64, preventing further movement of the bar and effectively "locking" the pivot bar and attached rear assembly in an elevated position.

Useful rod/aperture assembly materials and dimensions, including rod sleeves, are within the skill to determine. In one embodiment useful rod outer diameters can range between about 0.25-1.25 inches. Other diameters are contemplated, taking into consideration the desire to minimize size and weight, and maximize strength. Useful aperture and sleeve inner diameters can be in the range of about 0.3-2.0 inches. Other diameters are contemplated, taking into consideration the desire to minimize size and weight and maximize strength of the brace and the rod/aperture assembly. Similarly, useful rod lengths can readily be determined by those having ordinary skill in the art and preferred lengths can range from at least about 6-20 inches, more preferably in the range of about 7-15 inches.

Example 1. Rear Assembly Lifting Device with Static Bracket Pair

In the embodiments illustrated in FIGS. 4A-4D and described above, bracket members 18 are shown as stationary on fulcrumming means 12 and having a set, defined spanning distance. Movable bracket members also are contemplated so that the spanning distance between a pair of brackets can be varied to accommodate variations in drive track and suspension rail widths. In one embodiment, brackets 18 are fixed on center section 13, and the bracket spanning distance can be varied by modulating the length of center member 13 by, for example, making member section 13 expandable through a telescoping mechanism. In another embodiment, illustrated in FIGS. 5A & 5B and described in Example 2 below, at least one bracket 18 can slide along a length of center member section 13, allowing the distance between the brackets to be varied as desired.

Example 2. Rear Assembly Lifting Device with Movable Bracket Pair

Figure 5A:
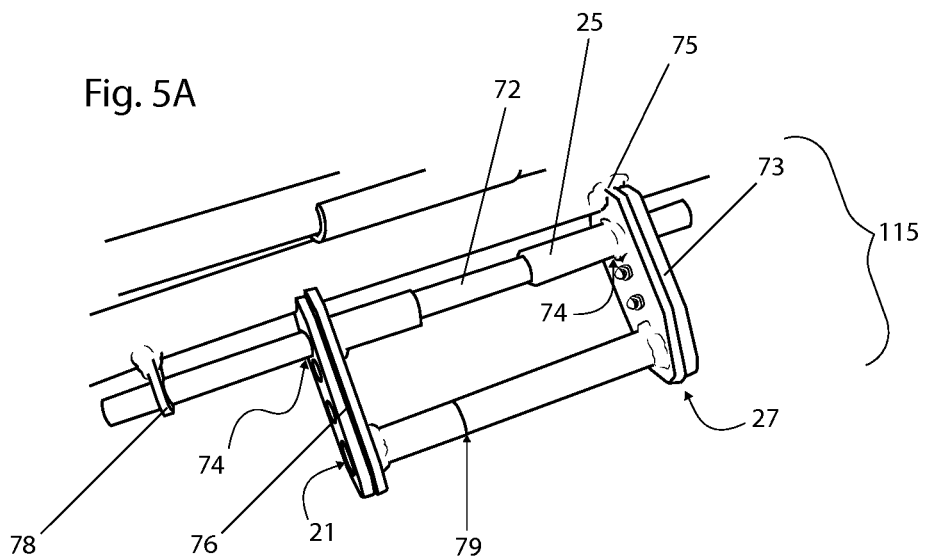
FIGS. 5A and 5B illustrate an embodiment of a snow vehicle rear drive track assembly lifting device of the present disclosure comprising a telescoping fulcrumming mechanism.
Figure 5B:
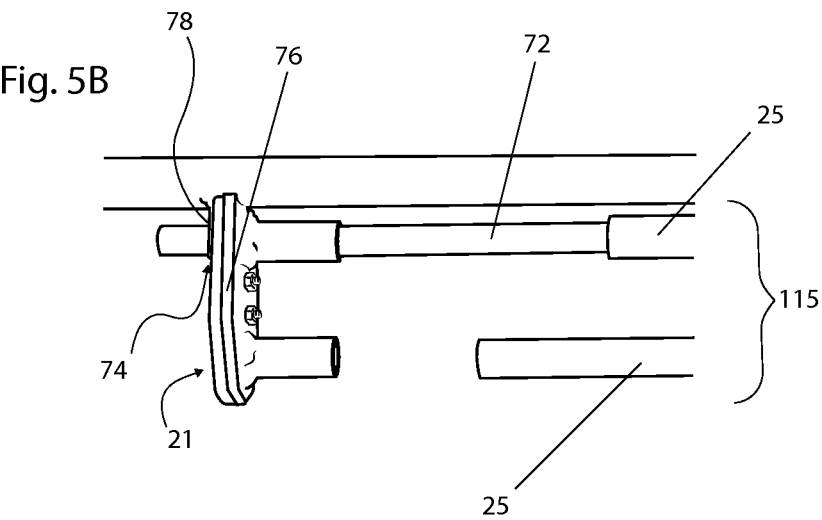

A rear assembly lifting device with a movable bracket pair is depicted in this example and in FIGS. 5A and 5B. In the example means for modulating the distance between a bracket pair is provided. In this example, a second rod/aperture assembly is provided on fulcrumming means or pivot bar 12. This second assembly, referred to herein as sliding bracket assembly 115, comprises a sliding rod 72 and sliding bracket apertures 74 positioned on brackets 18. In one embodiment, sliding bracket apertures 74 can be at positions distal to the engaging means apertures 21. In another embodiment, sliding bracket aperture 74 can be positioned near the pivot bar end of bracket 18. In the example, sliding rod 72 is fixed in position on pivot bar 12. One bracket member 18, referred to herein as fixed bracket 73, also is fixed in position, as in example 1. In one embodiment, fixed bracket 73 can be integrally attached to pivot bar center section 13, for example at juncture 75. The other bracket member, referred to herein as the sliding bracket 76, is not attached to pivot bar 12 and is free to slide axially along sliding rod 72 between a maximum and minimum position. Sliding bracket 76 minimum and maximum positions can be set by any standard means well known in the art. In one embodiment, these positions are set by a bracket stops on sliding rod 72. In the example illustrated in FIG. 5B, a maximum position bracket stop 78 is provided by a collar which also can serve to attach sliding rod 72 to center member 13. In the example illustrated in FIG. 5A, a minimum position bracket stop is provided by sleeves that extend inward from brackets 18 and stop lateral or axial movement of sliding bracket 76 when the open sleeve ends contact one another creating a minimum bracket stop 79. As will be appreciated by those skilled in the art, any desired sleeve length readily can be chosen by the user to provide the desired lateral or axial movement distance. In the figure, the sleeve bracket stop 79 is provided on sleeves extending from engaging means apertures 21. It will be appreciated that a sleeve bracket stop also can be provided by sleeves extending from sliding apertures 74. Similarly, a minimum position stop 79 also could be made by providing another collar about sliding rod 72 in place of a sleeve bracket stop.

Where a sliding bracket assembly comprises part of fulcrumming means 12, and bracket free ends 27 provide camming surfaces, sliding rod 72 can be the component of fulcrumming means 12 that rests on suspension rail top 64, providing the "locked, over-center" position of lifting device 10.

Lever

The over-center, self-locking rear drive track assembly lifting device 10 of the present disclosure comprises a levering means for moving fulcrumming means or pivot bar 12 from its unlocked, unlifted, resting position, to its lifted, over-centered and locked position, as illustrated in FIGS. 6A and 6B. While levering means are provided by the pivot bar 12 itself, which may be gripped and lifted directly, in a preferred embodiment, lifting device 10 comprises a handle or lever 34 and which acts as a lever to support lifting pivot bar 12 about fulcrumming means bracket free end 27 to lift the attached snow vehicle's rear assembly. As illustrated in FIG. 4, handle 36 of lever 34 can have a diameter for ease of gripping and a length such that it easily lifts the resistance, in this case the attached snow vehicle rear assembly, as pivot bar 12 rotates about its fulcrum point.

Lever 34 is functional when it is engaged with pivot bar 12, particularly when it is engaged with a leg 15 of pivot bar 12 such that lever 34 is substantially parallel to leg 15. Any suitable means for engaging lever 34 to a leg 15 is contemplated. In one embodiment illustrated in the figures, lever 34 can be removably engaged with a leg 15 by means of a lever holder 28 attached substantially parallel to leg 15 and dimensioned to receive a free end of lever 34. Lever holder 28 can define a substantially hollow container dimensioned to receive a lever member 34. Where lever member 34 has a tubular structure, a preferred hollow container 28 can be a tube.

In another preferred embodiment, lever holder 28 can include means for securing lever 34 in the holder. In one embodiment, holder 28 can be closed at its distal end 29. In another embodiment lever 34 can be secured to holder 28 by a pin mechanism. Various pin mechanisms are illustrated in the figures. These are illustrative only and any means known in the art are contemplated. In one example, illustrated in FIGS. 3 and 6, a straight pin opening 32 is provided on holder 28 through which a pin 33 extending from lever 34 can align and fit when lever 34 is placed in holder 28. In another embodiment, illustrated in FIGS. 4A-4D, pin opening 32 can be angled and secure lever 34 in holder 28 when pin 33 traverses the length of opening 32. Additional securing means also can be provided by cotter pins, dowel pins, and the like. In the rear drive track assembly devices illustrated in the figures herein, a single lever holder 28 is shown. As will be appreciated by those having ordinary skill in the art, lifting devices 10 are contemplated having a single lever holder 28 on either leg 15, or having two lever holders, one on each leg 15.

Lifting device 10 further also can include a means for storing lever 34 when lifting device 10 is not in use. In one embodiment, storing means 30 can be located on fulcrumming means 12 and comprises, without limitation, for example, a clip or collar or hollow tube 30 through into which lever 34 can be inserted, the interior diameter of lever storage means 30 being dimensioned to receive and hold lever 34. In the examples illustrated in the figures, storage means 30 is located on center spanning section member 13. As will be appreciated by those having ordinary skill in the art, storage means 30 can be positioned anywhere on fulcrumming means 12 that is useful and does not interfere with operation of device 10.

Figure 4A:
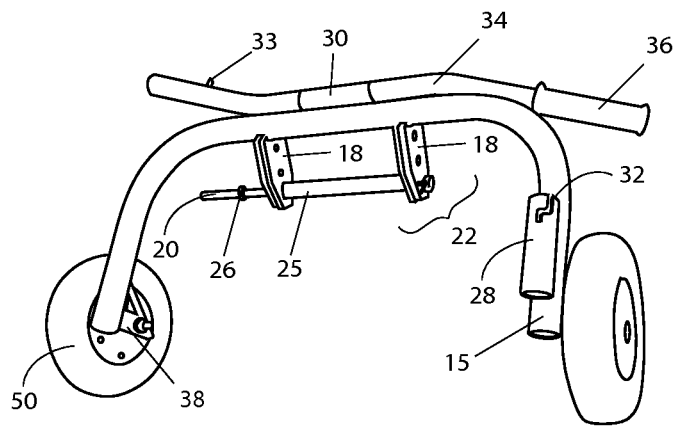
FIGS. 4A-4D illustrate various positions of a levering component of a snow vehicle rear drive track assembly lifting device of the present disclosure.
Figure 4B:
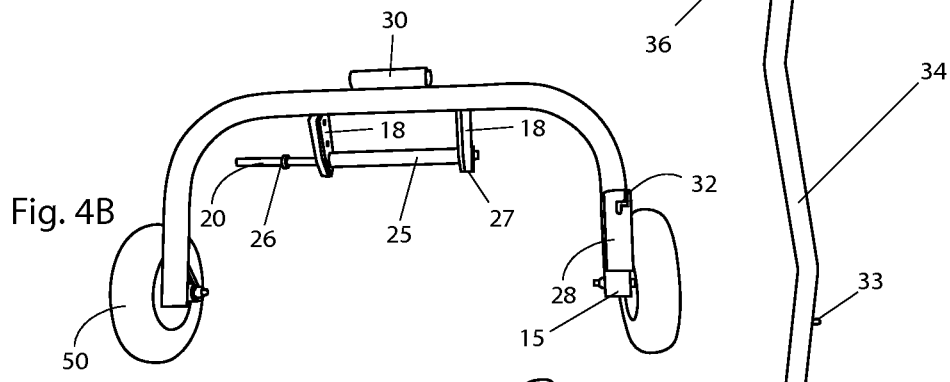
Figure 4C:
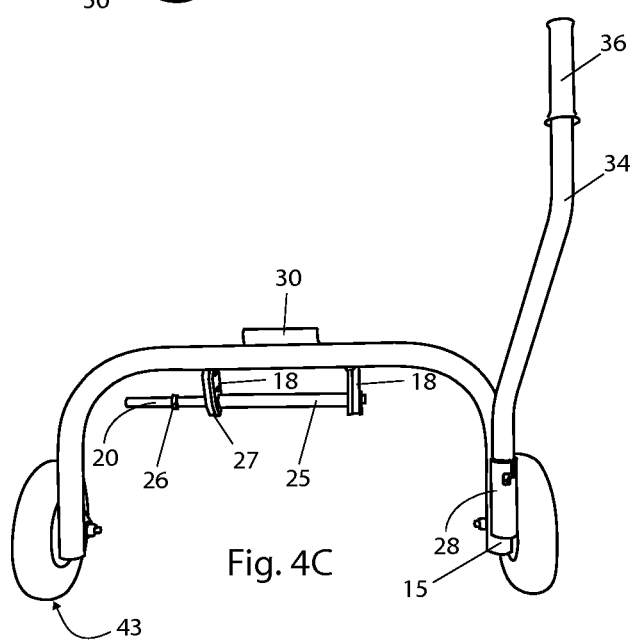
Figure 4D:
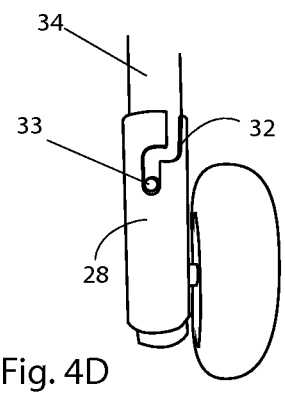

Those skilled in the art will appreciate that lever 34 may have a useful length in the range of about 12-48 inches, more preferably in the range of about 20-36 inches, and that preferred lengths can be determined without undue experimentation to identify desired dimensions that provide ease of levering without undue length. Similarly, useful lever diameters are within the skill of the art to determine. Where lever materials comprise a rigid, non-fatiguing metal, useful diameters can be in the range of at least about 0.25-2.0 inches. Other useful materials and other diameters and lengths are contemplated. Useful levers can comprise a single component, such as a hollow tube; a telescoping component; or they can comprise a plurality of components that interlock, as by threading, for example. In another preferred embodiment, handle end 36 of lever 34 can comprise a gripping means for ease of handling. Useful grips can be achieved, for example, by contouring or texturing free end 36, and/or by covering handle end 36 with a useful gripping material. Lever 34 also can have a substantially linear longitudinal profile as illustrated in FIGS. 3 and 6, or it can have an angled profile, such as is illustrated in FIGS. 4A-4C, for example to accommodate a snowmobile sled's external foot wells or running boards. In one embodiment, lever 34 can include one angle or a plurality of angles. In another embodiment, useful lever angles can be in the range of about 10-30°.

Method of Use

In use, a rear drive track assembly lifting device 10 of the present disclosure can be engaged with a snow vehicle's rear drive track using the following process. It will be appreciated that the order of various operational steps can be varied without impacting functionality of the device or method of use. Referring in particular to FIGS. 6 and 7, pivot bar 12 can be passed through central opening 47 in the rear drive track assembly such that pivoting bar legs 15 span the width of and extend out beyond drive track 55, with wheel member 50 (or contact point 43) in contact with the ground, and bracket member free ends 27 in contact with rail floor surface 68. Pivot bar 12 is positioned in interior 47 such that engaging bracket apertures 21 are accessible through rail openings 61. Engaging rod 22 then can inserted through rail opening 61 and brace member apertures 21 so that pivoting member bar 12 is now attached to the rear drive track assembly. If desired, rod 22 is secured in position, for example by means of a bracket stop 26, so that it does not accidentally disengage or slip out of position. The rear drive track assembly is now in its resting position. Lever 34 can be engaged with pivot bar 12, for example by inserting a free end of lever 34 into a lever holder 28 attached to pivot bar 12. If desired, lever 34 can be secured to holder 28, for example, by means of a pin mechanism. Lever 34 then is lifted towards a position perpendicular to the floor, preferably by gripping handle 36, lifting pivot bar 12 with it and allowing the camming surface of bracket free ends 27 to move along rail floor surface 68, pivoting bar 12 up and over its center of gravity. The action of lifting pivoting member 12 also lifts the attached rear drive track assembly. Where the ground contact point 43 is wheel member 50, movement of lever 34 and pivoting member 12 over its center of gravity is facilitated by rotation of wheel member 50 along the ground. As pivot bar 12 moves past its center of gravity it comes to rest in an over-center position on rail top bar 64. In one embodiment, center spanning section 13 can rest on top bar 64. In another embodiment, bracket sliding rod 72 or brackets 18 can rest on rail top bar 64. The weight of attached rear drive track assembly and the bracing action of contact with rail bar 64 keeps device 10 in a stable and reliably engaged, lifted and locked position, with an elevated rear drive track assembly that now is available for maintenance or repairs. When the front ski assembly of the snow vehicle is similarly lifted using a front ski assembly lifting device of the present disclosure, the vehicle is now ready to be moved about on dry ground. The vehicle is easily moved by holding the vehicle at any position, including the handle bars, the sides of the vehicle or the back of the vehicle. Moreover, the user could straddle the vehicle and maneuver it from that position. The vehicle remains lifted without requiring additional contact. Lever 34 can be removed from its holder 28 and set aside until the user is ready to move lifting device 10 from its engaged position to its resting position and return the rear drive track assembly portion of the snow vehicle to the ground.

Disengaging the rear drive assembly lifting device 10 from its lifted, engaged position is simply a matter of pulling lever 34 back towards its resting position, which action rotates the bracket members' camming surfaces along rail floor 68, returning attached pivot bar 12 back to its resting position. Returning pivot bar 12 to its resting position returns the drive track to the ground. Lever 34 then is removed from its holder, engaging rod 22 is removed from the aperture assembly, and pivot bar 12 is passed out of interior opening 47. If desired, lever 34 can be stored together with pivot bar 12, for example by attachment to a storage means 30. Similarly, engaging rod 22 can be stored together with the pivot bar 12, by attachment to a storage means 30 or by reinserting rod 22 through bracket apertures 21 and securing it thereto by means of a collar or useful pin mechanism, such as a cotter pin, dowel, or ring through a pin opening 24.

Front Ski Assembly Lifting Component

Referring now to FIGS. 8-11, embodiments of a device for lifting the front ski assembly of a motorized snow vehicle are provided.

Front Ski Pivot Bar

In this embodiment, illustrated in FIGS. 8 and 9, just as for the rear drive track assembly lifting device described above, a front ski assembly lifting device 80 is disclosed comprising a fulcrumming means 81, a front ski engaging means, and a lever 34. As for the rear assembly device, fulcrumming means 81 can comprise a substantially C-shaped pivot bar 81 having an overall width dimensioned to span and extend beyond the width of a snow vehicle's front ski. Front ski pivot bar 81 also can comprise a center spanning section 13 and two legs 15 having a point of contact with the ground. In one preferred embodiment, the terminal free ends of legs 15 are each attached to a wheel member 50 as described above for a rear assembly lifting device 10 and illustrated in FIG. 3, and which provide the points of contact with the ground. Wheel member 50 also can be attached to a tab 38, for example by means of an axle bolt assembly 40, such that the axis of rotation of wheel member 50 is substantially parallel to the floor. Together tab 38 and wheel member 50 make up wheel assembly 70. Useful wheel members 50 can include any wheels dimensioned to support the weight of the snow vehicle to be maneuvered. Useful wheels can be pneumatic wheels and their equivalents having diameters in the range of about 4 inches to 12 inches, more preferably in the range of about 6 inches to 10 inches.

In one embodiment, tab 38 of wheel assembly 70 facilitates movement of pivot bar 81 about its fulcrum point into an over center position. In another embodiment, tab 38 can be configured to substantially define a right angle. In one example, tab 38 can define a right triangle with tab legs 39 and 41 and a hypotenuse 37. In the example illustrated, tab leg 39, referred to herein as "attached" tab leg 39 can be integrally attached to leg 15 in a substantially parallel relationship to leg 15 such that tab 38's right angle faces leg 15's terminal free end and "free" tab leg 41 is substantially extends perpendicularly down from attached leg 15. When pivot bar 80 is positioned such that the pivot bar plane is in a raised position, more perpendicular to the ground than parallel to it, free tab leg 41 then can be substantially parallel to the ground; when the pivot bar plane is in a lowered position, more parallel to the ground than perpendicular to it, free tab leg 41 can be substantially perpendicular to the ground. As described herein below, in its resting position, the plane of front ski pivot bar 80 is in a raised position, more perpendicular to the ground than parallel, and free leg 41 then can lie more parallel to the ground. In its engaged, over center position, the plane of front ski pivot bar is in a lowered position more parallel with the ground, and free leg 41 can be in a more perpendicular position relative to the ground. As will be appreciated by those having ordinary skill in the art, tab 38 can be configured as a solid component, or it can comprise a frame defining an opening, as illustrated in FIG. 3. Those skilled in the art will appreciate that useful tabs can have modified shapes from the right angled triangle disclosed here. For example, a right angle tab 38 also can be provided having an L-shape.

In the embodiment where only tab 38 is provided, point 43 of tab 38 can provide the point of contact with the ground when pivot bar 81 is in its engaged, over-center position, and tab leg 41 can provide the point of contact with the ground when lifting device 80 is in resting, unengaged position.

In another embodiment, device 80 also can be fabricated to include stabilizing wheel axle assemblies as described below. Useful stabilizing axle assemblies can include a hanger and flexible bushing combination that provides a cushioning, pivoting axle action competent to keep the lifting device 80 and attached ski assembly on the ground while moving or turning an engaged, lifted motorized snow vehicle. Useful stabilizing axle assemblies include board trucks, including those used in skateboards. Those skilled in the art can choose between standard, off the shelf truck sizes.

Also as will be appreciated by those skilled in the art, pivot bar 81 can include a stabilizing brace 87 between legs 15. Stabilizing brace 87 also can be contoured to accommodate varying ski keel and skag dimensions.

Front ski pivot bar 81 further can include means 82 for holding and supporting a front ski 90. In a preferred embodiment, support means 82 lifts and holds the rear or distal end of ski 90, opposite handle 93, when device 80 is in its over-center, locked position. In one embodiment, support means 82 can comprise a pair of elongated tubular or rectilinear components or bars attached to the inside edge of each of legs 15 and extending inward towards each other on a plane substantially parallel to the plane of the pivot bar spanning section 13, and perpendicular to legs 15. In one preferred embodiment, the free ends of the support bars create a gap or opening 87 dimensioned to accommodate a ski keel and/or skag. Together, the pair of ski support components define a platform on which the front ski can rest. In another embodiment, illustrated in FIGS. 8A-8C, support means 82 can include a rotating surface such as the edge of a wheel on an axle extending inward from legs 15 and on which the bottom edge of a ski can sit. In a preferred embodiment a gap 87 is provided to accommodate a ski keel and/or skag. The overall length and dimensions of the front ski support means 82 selected can be fabricated to accommodate the range of ski widths available for personal snow vehicles. Similarly, and as will be appreciated by those having ordinary skill in the art, the positioning and dimensions of ski support means 82 on legs 15, relative to spanning center section 13, can be dimensioned to maximize interior opening 86, maximizing ease of inserting the front of ski 90 through opening 86 and onto support means 82.

Front ski pivot bar 12 further can comprise a bracket 84 extending from center spanning section member 13 and having a free end 85 which provides both a front ski engaging means and a pivoting or fulcrumming surface for pivot bar 80 when free end 85 is in contact with ski spindle 92 at juncture 91. In a preferred embodiment, bracket 84 comprises a substantially rectilinear component attached along the inside edge of spanning section 13 substantially at spanning section 13's midpoint and in a plane parallel to spanning section 13. Bracket free end 85 also preferably can be dimensioned to rest against the front juncture edge 91 of ski 90 and ski spindle 92. Bracket 84 can be composed of a plastic, including a molded plastic, if desired, and its front edge or free end 85 further can be contoured to fit snugly against juncture 91. FIG. 8 illustrates one embodiment of bracket 84 and free end 85.

Front ski pivot bar 80 further can comprise a levering means 34. As described above for rear assembly lifting device 10, levering means 34 can act as a lever to assist shifting pivot bar 80 about its bracket free end 85 fulcrumming point to lift the snow vehicle, in this case the front ski assembly. Handle 36 of lever 34 can have a diameter for ease of gripping and a length such that it easily lifts the resistance, in this case the front ski assembly, as pivot bar 80 moves into an engaged over-center position. In one preferred embodiment, lever 34 can be attached to the outside edge of spanning section 13's midpoint, substantially opposite bracket 84. Those skilled in the art will appreciate that lever 34 can have other useful positions on pivot bar 80, and a range of useful lengths, including lengths in the range of about 6-24 inches, more preferably in the range of about 8-18 inches. Other length ranges can be determined without undue experimentation to identify desired lengths that provide ease of pivoting without undue length. Similarly, useful lever diameters are within the skill of the art to determine. Where lever materials comprise a rigid, non-fatiguing metal, useful diameters can be in the range of at least about 0.25-2.0 inches. Other useful materials and other diameters and lengths are contemplated. Useful levers can comprise a single component, such as a hollow tube; a telescoping component; or they can comprise a plurality of components that interlock, as by threading for example. In another preferred embodiment, handle end 36 of lever 34 can comprise a gripping means for ease of handling. Useful grips can be achieved, for example, by contouring or texturing handle end 36, and/or by covering end 36 with a useful gripping material. In still another embodiment, lever 34 can be angled along its length for ease of gripping and access. Useful angles may be in the range of about 1° to 45°. In another embodiment, useful angles may be in the range of between about 3° to 30°.

Figure 9A:
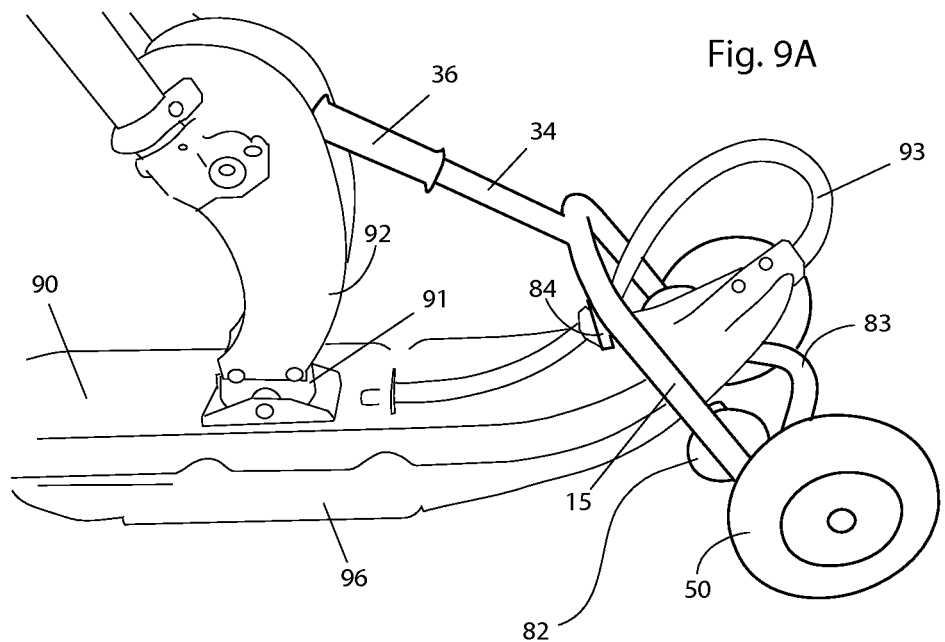
FIGS. 9A and 9B illustrate the snow vehicle front ski assembly lifting device illustrated in FIG. 8 in the resting position (9A) and the engaged, locked and elevated position (9B) on a front ski.
Figure 9B:
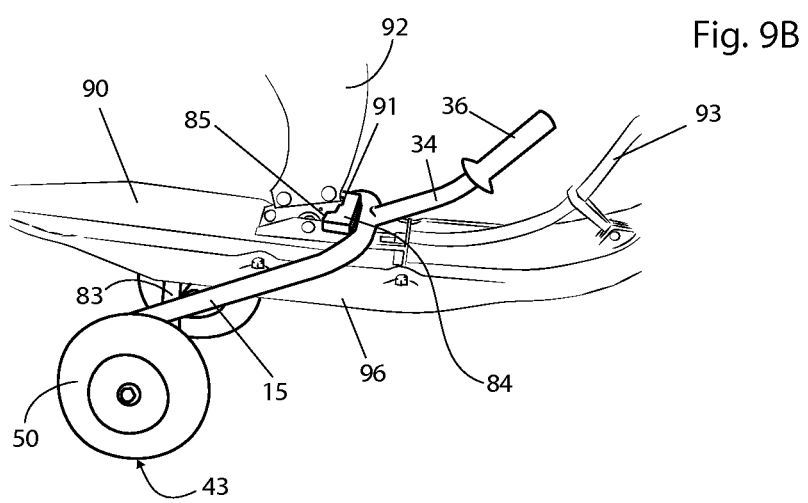

In use, front ski assembly lifting device 80 can be engaged with a snow vehicle's front ski by inserting the front of ski 90 through pivot bar interior space 86 so that the pivot bar spans the top of ski 90 and ski handle 93 and pivot bar lever 34 are facing the same direction (FIG. 9A). Support means 82 then are brought into position under ski 90 and supporting it, either by lifting ski handle 93 or maneuvering device 80, and bracket front edge 85 comes to rest against or near spindle juncture 91. Lever 34 is then gripped, preferably at handle 36, and shifted or moved downward so bracket free edge 85 engages with spindle juncture 91 and device 80 pivots about the bracket free edge fulcrum or pivot point 85, preferably facilitated by rearward rotation of wheel members 50. This action brings pivot bar center section 13 down onto ski 90 and lifts legs 15 up, thereby lifting attached support means 82 and the distal end of ski 90 resting on support means 82 (FIG. 9B). Front ski assembly 100 now is in a stable and reliably engaged, lifted and locked position. In the instance where the snow vehicle is a snow bike, particularly a motorized snow bike, a single front ski assembly pivot bar is sufficient. In the instance where the snow vehicle comprises a plurality of front skis, as in a snow sled, separate front ski assembly pivot bars of the present disclosure can be used for each ski. To disengage the front ski assembly device 80 from its lifted and locked position, lever 34 can be pulled up to disengage bracket front edge 85 from the ski spindle juncture 91 and bring pivot bar 81 back to its resting position. The device then can be rolled forward and off front ski 90.

When both the front ski assembly and the rear drive track assembly are engaged with a lifting device of the present disclosure, the snow vehicle readily and reliably can be maneuvered about a dry surface without concern for a need to balance the machine as it is being moved. As will be appreciated by those having ordinary skill in the art, the lifting devices of the present disclosure also allow only the front ski assembly or rear drive track assembly to be lifted as desired.

Front Ski Cradle

Figure 10A:
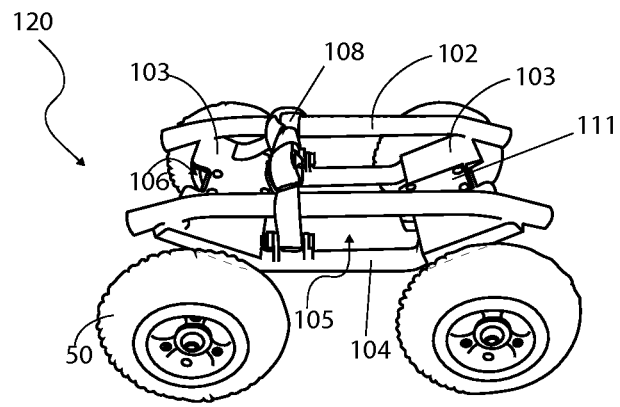
FIGS. 10A-10C illustrate another embodiment of a snow vehicle front ski assembly lifting device of the present disclosure.
Figure 10B:
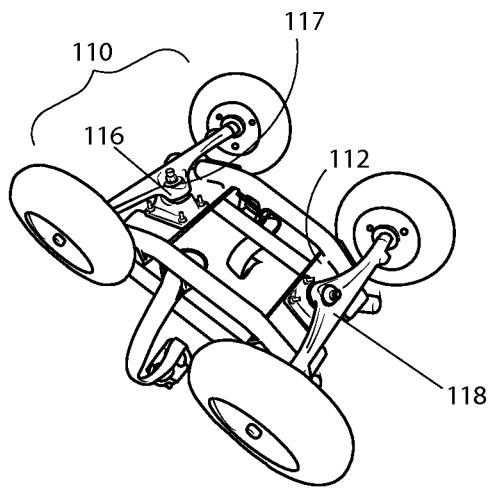
Figure 10C:
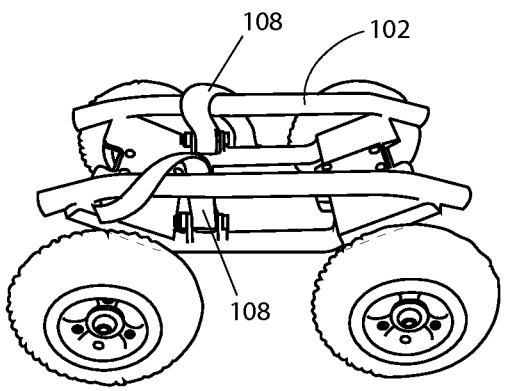
Figure 11:
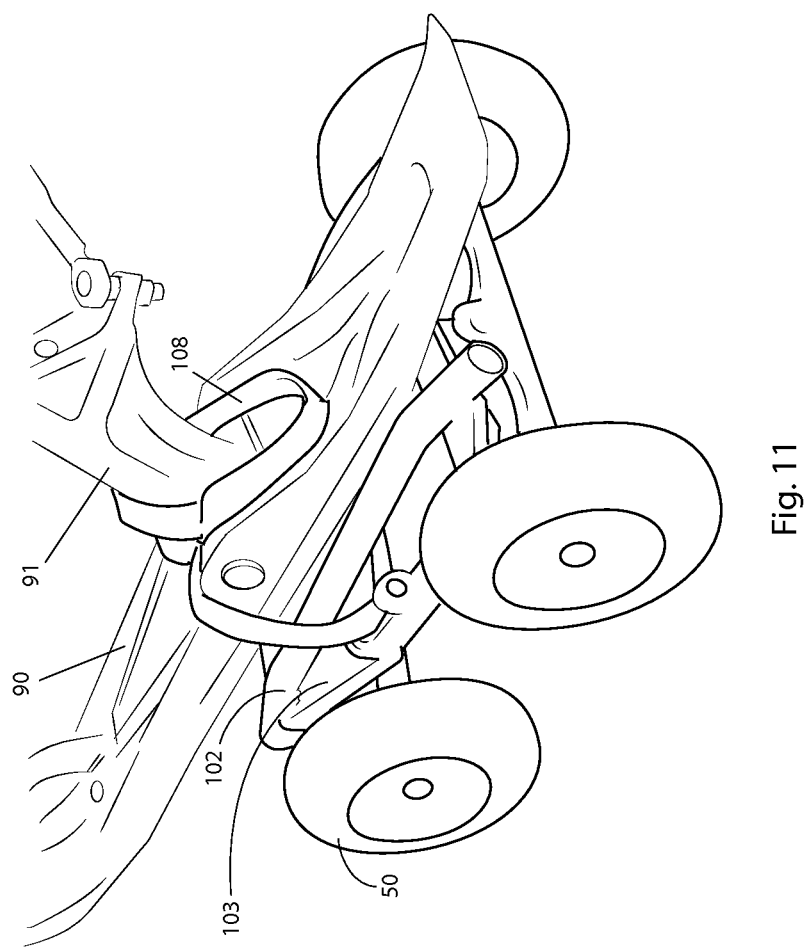
FIG. 11 illustrates the snow vehicle front ski assembly lifting device illustrated in FIG. 10 in position on a front ski.
Figure 12:
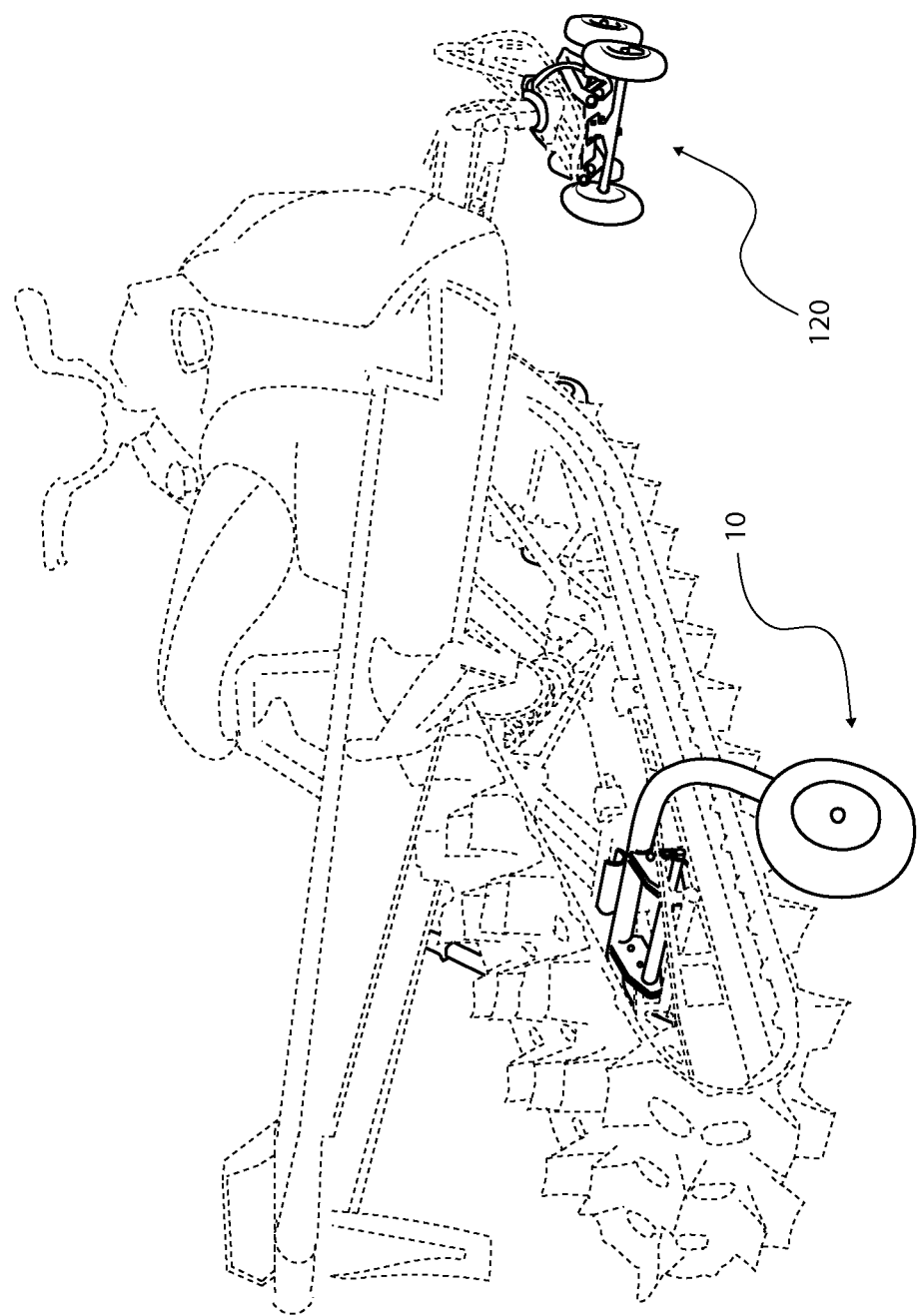
FIG. 12 illustrates a motorized snow vehicle using embodiments of the front ski assembly lifting device and the rear drive track lifting device of the present disclosure.

In accordance with another embodiment of the disclosure and as illustrated in FIGS. 10-11, a front ski cradle 120 is provided as a means for stably engaging a motorized snow vehicle's front ski assembly in a lifted and mobile position. In one preferred embodiment the cradle can accommodate front ski assemblies with a plurality of keels, keel depths and carbide skags. Cradle 120 comprises means for holding a front ski assembly in an elevated position, means for engaging the assembly, and means for moving the ski assembly in its stable, elevated position. In one embodiment illustrated in the figures, cradle 120 can include a pair of top rails 102, a pair of bottom rails 104, a front and rear spanning brace 103, and an interior cavity 105. Cradle 120 also can include a ski assembly engaging means 108, and wheel members 50. In a preferred embodiment wheel members 50 can be attached to cradle 120 by means of stabilizing axle assemblies 110 that allows the wheel to pivot when weight is concentrated over the wheel. In one embodiment, stabilizing axle assemblies can include hangars 116 and flexible bushings 117 and grommets for stability and both cradle and snow vehicle turning ease. Useful axle assemblies 110 also can include trucks such as skateboard trucks.

In one embodiment, top rails 102 can provide the surface on which a front ski assembly rests and bottom rails 104 can provide structural support and the means for attaching wheel axle assemblies 110 to cradle 120. It will be appreciated that the spanning distance between top rails 102 and between bottom rails 104 can be the same or different. Preferred rail spanning distances can be chosen by the user. In one embodiment, the top rail 102 spanning distance accommodates both wide, multi-keel skis, narrower skis, and skis with fewer keels. In the embodiment in the examples shown herein, top rails 102 have a spanning distance and are dimensioned to fit inside the outer skags of a motorized snow vehicle ski. Narrower skis and those having one central skag as may be found on snow bikes for example, can fit between top rails 102 and rest on the top surface of front and rear brace 103 as described below. Useful top rail 102 spanning distances can be in the range of about 9-14 inches, more preferably 10-12 inches. Top rail lengths can be in the range of about 15-20 inches, or even in the range of about 16-18 inches, and other lengths are contemplated. Top rails 102 also can be substantially linear or angled. In one embodiment, depicted in FIGS. 10-11, top rail 102 is angled. In one embodiment top rail 102 can be angled to mirror the contour of ski 90's angled front edge. Providing an angled top rail can facilitate lifting a front ski assembly up and onto cradle 120. Useful angle ranges can be in the range of about 15-25°. Similarly, bottom rail 104 can be substantially linear or angled as depicted in the figures. Angling bottom rail 104 can support maintaining ski assembly 100 in an elevated position in the event of a wheel failure. Useful angle ranges can be determined readily by the fabricator or user. Sample ranges can include those in be in the range of about 15-25°. Useful rails 102 and 104 can be substantially tubular or rectilinear and can have a range of useful diameters, including the range of 0.5-2.0 inches.

Top rails 102 and bottom rails 104 can be joined by front and rear braces 103. As will be appreciated by those skilled in the art, the braces can comprise a solid plate as illustrated in the figures, or one or a plurality of horizontal or diagonal brace components. In a preferred embodiment, the position and dimension of brace 103 can accommodate a central ski keel and/or skag that extends from the underside of ski 90. For example, in the figures, plate 103 includes a cut or opening 106 along its upper surface and into which a central skag or keel can fit. Other means for accommodating a central skag are within the skill of the art. In addition, one or both of front and rear brace 103 can include a removable wear plate 111 to absorb wear to the brace from a carbide skag.

Cradle 120 also can include a ski engaging means 108 for attaching cradle 120 to ski 90. In the figures, engaging means 108 can include a cinching strap or belt, such as a ratchet strap or the like. Any preferably flexible means for connecting ski assembly 90 to cradle 120 can be used to advantage. As will be appreciated by those skilled in the art, ski engaging means can be removably attached to cradle 120, for example by means of a pin. In one embodiment, engaging means 108 can be anchored to bottom rail 104. In another embodiment, engaging means 108 can be attached to cradle 120 so that it can be strapped around the outside of top rail 102 when a wide ski is on cradle 120 as illustrated in FIGS. 10A and 11, and also be brought inside top rail 102 and around a narrow ski, as illustrated in FIG. 10C. In FIG. 11 engaging means 108 wraps about the outside of top rail 102, is cinched to ski 90 in front of spindle 91 and spindle juncture 93, and excess strap loosely looped about spindle 91 and tucked away.

Cradle 120 also can include wheel members 50 attached to cradle 120 by stabilizing axle assemblies 110, as illustrated in FIG. 10B. Axle assemblies can be attached to cradle 120 by any suitable means. Preferred axle assemblies can include a hanger and bushing combination that provides a cushioning, pivoting axle action competent to keep the cradle and attached ski assembly on the ground while moving or turning an engaged, lifted motorized snow vehicle. Useful stabilizing axle assemblies include board trucks, including those used in skateboards, which are well known and well characterized in the art. Useful trucks typically include a mounting base for mounting to the cradle brace with standard nuts and bolts, a right and left wheel axle that extend perpendicularly to the sides of the cradle and the direction of the cradle's travel. Each wheel axle is mounted through a yoke that includes a hangar 116 and pivot arm inserted into a rubber bushing mount 117, typically urethane, in a pivot hole in the socket hub. The yoke can be mounted by a king bolt to the mounting base, and the king bolt can clamp the hangar with a plurality of grommets, at least one of which is flexible. Those skilled in the art can choose between standard, off the shelf truck sizes. Useful wheels can be pneumatic wheels and their equivalents having diameters in the range of about 4 inches to 12 inches, more preferably in the range of about 6 inches to 10 inches. In one preferred embodiment, axle assemblies 110 can be attached to the underside of braces 103. In another embodiment, braces 103 can be positioned on cradle 120 at an angle to accommodate the axle assemblies and keep the cradle's center of gravity low. In one embodiment, the braces can be positioned at an angle in the range of 15-25° from horizontal. In another embodiment, braces 103 can be positioned on bottom rails 104 to minimize the distance between front and rear wheel members 50. In still another embodiment, brace angles, wheel members, rails and axle assemblies can be configured so that the overall height of cradle 120 is in the range of about 7-9 inches and has a ground clearance in the range of about 3-5 inches.

In the examples provided herein, cradle 120 is an open-walled device, with an interior cavity 105. The dimensions of interior cavity can be varied as desired to accommodate any desired ski and skag dimension, including those for both sled skis and bike skis. One useful cavity depth can be in the range of about 3-5 inches. It will also be appreciated that cradle 120 can have side walls. In the examples provided, the open-sided device 120 provides a lightweight device and top rails 102 and bottom rails 104 provide convenient handle means for carrying device 120.

In use, a front ski 90 is lifted by handle 93 and cradle 120 is slid under the ski such that any central skag lies in brace openings 111 and top rails 104 slide along the bottom surface of the ski, between any lateral outer skags, if any. When ski 90 is substantially centered on cradle 120, engaging means 108 then is used to secure cradle 120 to ski 90.

Front ski assembly 100 now is in a stable and reliably engaged, lifted and locked position. In the instance where the snow vehicle is a snow bike, particularly a motorized snow bike, a single front ski assembly cradle is sufficient. In the instance where the snow vehicle comprises a plurality of front skis, as in a snow sled, separate front ski assembly cradles of the present disclosure can be used for each ski. To disengage the front ski assembly cradle 120 from its lifted and locked position, engaging means 108 are disengaged from ski 90, ski handle 93 is lifted, and cradle 120 is slid out from under ski 90.

When both the front ski assembly and the rear drive track assembly are engaged with a lifting device of the present disclosure, the snow vehicle readily and reliably can be maneuvered about a dry surface without concern for a need to balance the machine as it is being moved. As will be appreciated by those having ordinary skill in the art, the lifting devices of the present disclosure also allow only the front ski assembly or rear drive track assembly to be lifted as desired.

Embodiments of this disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes that come within the meaning and range of equivalency of the claims are therefore intended to be embraced therein. While illustrative embodiments have been illustrated and described, it will be appreciated that various changes can be made therein without departing from the spirit and scope of the disclosure.

The invention claimed is:

1. A device for lifting and locking the drive track assembly of a motorized snow vehicle into an elevated position off the ground, comprising:
    (a) an elongated C-shaped pivoting member having a center drive track spanning section and two opposing terminal free ends, the pivoting member dimensioned to pass through and span the central opening defined by a snow vehicle drive track assembly such that both said terminal free ends contact the ground external to said drive track and on opposing sides thereof, said pivoting member further defining a fulcrum means for lifting said pivoting member;
    (b) levering means attached to said pivoting member and dimensioned to lift said pivoting member about said fulcrum means, and
    (c) attachment means for attaching said pivoting member to the parallel, opposing suspension rail portion of said drive track assembly, such that said drive track assembly is lifted together with said pivoting member and locked into an elevated position when said pivoting member is lifted over its fulcrum means and comes to rest on said suspension rails.

2. The device of claim 1 wherein said fulcrum means comprises a camming surface extending out from the center section of said pivoting member and dimensioned to contact the floor surface of said suspension rail.

3. The device of claim 2 wherein said camming surface comprises a pair of brackets attached to the drive track spanning section of said pivoting member, the distance between said brackets being bounded by said parallel, opposing suspension rails.

4. The device of claim 3 wherein said attachment means comprises a rod dimensioned to through and span opposing openings in said parallel suspension rails and in said brackets, such that when said rod is placed in said openings and spans said parallel rails, said drive track assembly is attached to said pivoting member.

5. The device of claim 4 wherein said attachment means further comprises means for securing said rod in its attached position.

6. The device of claim 1 wherein said levering means is removably attached to said pivoting member.

7. The device of claim 6 wherein said levering means is attached to a leg of said pivoting member by means of a levering means holder.

8. The device of claim 7 wherein said holder comprises a hollow sleeve and said levering means comprises an elongated tubular component dimensioned to pass through said sleeve.

9. The device of claim 8 further comprising means for limiting the distance said levering means can pass through said sleeve.

10. The device of claim 1 wherein said pivoting member further comprises storage means for said levering member when not in use.

11. The device of claim 1 wherein said pivoting member terminal free ends comprise wheel members suitable for rolling said motorized snow vehicle on a surface when said drive track assembly is in said locked elevated position.

12. A device for lifting and locking a motorized snow vehicle front ski assembly comprising a ski and attached ski spindle into an elevated position off the ground, comprising:
    (a) a C-shaped pivoting member having a center section dimensioned to span a said ski and two opposing legs with terminal free ends dimensioned to contact the ground on opposing sides of said ski, said pivoting member further comprising fulcrum means about which said device can be pivoted;
    (b) levering means attached to said pivoting member and dimensioned to rotate said pivoting member about said fulcrum means;
    (c) engagement means for engaging said pivoting member with said front ski assembly such that said assembly is lifted together with said pivoting member and locked into an elevated position when said pivoting member is rotated about its fulcrum means and comes to rest on said ski surface.

13. The device of claim 12 wherein said attached fulcrum means comprises a bracket extending out from said pivoting member and dimensioned to engage the front edge of a said ski assembly spindle.

14. The device of claim 12 wherein said engagement means comprises means attached to said pivoting member legs and dimensioned to lift and support the bottom surface of a said ski when said pivoting member is rotated about its fulcrum.

15. The device of claim 14 wherein said engagement means comprises opposing support bars extending inward from opposing legs of said pivoting member.

16. The device of claim 15 wherein the free ends of said support bars define a gap sufficient to receive a ski keel or skag.

17. The device of claim 14 wherein said engagement means comprises the rotating axial surface of opposing wheels extending inward from opposing legs of said pivoting member.

18. The device of claim 12 wherein said two opposing terminal free ends comprise wheel members suitable for rolling said motorized snow vehicle on a surface when said front ski assembly is in said locked elevated position.

19. A device for lifting and locking the front ski assembly of a motorized snow vehicle into an elevated position off the ground, comprising:
   (a) a cradle for receiving and supporting the bottom surface of a front ski in an elevated position;
   (b) engagement means for attaching said ski to said cradle, and
   (c) a plurality of wheel members suitable for rolling said motorized snow vehicle on a surface when said front ski assembly is attached to said cradle, said wheels attached to said cradle by an angled stabilizing axle assembly comprising a hangar and flexible bushing.

20. The device of claim 19 wherein said engagement means comprises a flexible strap.

21. A method for lifting and locking a motorized snow vehicle rear drive track assembly having opposing parallel suspension rails into an elevated position off the ground, comprising the steps of:
   (a) providing an elongated C-shaped pivoting member through the opening defined by a snow vehicle track assembly, the pivoting member having a center drive track spanning section dimensioned to pass through and span the central opening defined by a snow vehicle drive track assembly and two opposing terminal free ends such that said terminal free ends contact the ground external to said drive track and on opposing sides thereof when said pivoting member is passed through and spans said opening, said pivoting member further defining fulcrum means for lifting said pivoting member center section over the fulcrum point;
   (b) engaging said pivot member with the opposing parallel suspension rails of said drive track assembly, and
   (c) lifting the center section of said pivoting member over its fulcrum means and onto said suspension rails.

22. The method of claim 21 wherein said pivoting member opposing terminal free ends comprise wheel members suitable for rolling said motorized snow vehicle on a surface when said drive track assembly is in said locked elevated position.

23. A method for maneuvering a motorized snow vehicle over dry ground, comprising the steps of:
   (a) providing an elongated C-shaped pivoting member to the rear drive track assembly of a said motorized snow vehicle, the pivoting member having a center drive track spanning section, terminal free ends comprising wheels, and dimensioned to pass through and span the central opening defined by a snow vehicle drive track assembly such that said terminal free ends contact the ground external to said drive track, said pivoting member further defining fulcrum means for lifting said pivoting member center section over the fulcrum point;
   (b) engaging said pivoting member with the opposing parallel suspension rails of said drive track assembly, and
   (c) lifting the center section of said pivoting member over its fulcrum means and onto said suspension rails;
   (d) providing a cradle for receiving and supporting the bottom surface of a front ski in an elevated position, said cradle comprising engagement means for attaching said ski to said cradle and a plurality of wheel members attached to said cradle by an angled stabilizing axle assembly comprising a hangar and flexible bushing;
   (e) rolling said cradle under said ski;
   (f) engaging said cradle with said ski by said engagement means, and
   (g) rolling said motorized snow vehicle over said ground on said wheels.

24. The method of claim 23 wherein said motorized snow vehicle is a snow bike, snow sled or snowmobile.

* * * * *